United States Patent [19]

Berkbuegler

[11] Patent Number: 4,995,475

[45] Date of Patent: Feb. 26, 1991

[54] HUNTER'S PORTABLE TREE STAND

[76] Inventor: Ronald L. Berkbuegler, 209 E. Marceau, St. Louis, Mo. 63111

[21] Appl. No.: 421,401

[22] Filed: Oct. 13, 1989

[51] Int. Cl.$^5$ .............................. A45F 3/26; A47C 9/10
[52] U.S. Cl. ...................................... 182/187; 182/133
[58] Field of Search ............... 182/187, 188, 134, 135; 108/152

[56] References Cited

U.S. PATENT DOCUMENTS

| | | | |
|---|---|---|---|
| 3,485,320 | 12/1969 | Jones | 182/129 |
| 3,817,350 | 6/1974 | Gray | 182/187 |
| 3,885,649 | 5/1975 | Damron | 182/187 |
| 4,022,292 | 5/1977 | Van Gompel | 182/187 |
| 4,230,296 | 10/1980 | Staley | 182/187 |
| 4,321,982 | 3/1982 | Strickland | 182/187 |
| 4,428,459 | 1/1984 | Peck | 182/187 |
| 4,553,634 | 11/1985 | Roberts | 182/187 |
| 4,722,421 | 2/1988 | Hilbert | 182/187 |
| 4,726,447 | 2/1988 | Gibson | 182/187 |
| 4,787,476 | 11/1988 | Lee | 182/187 |

Primary Examiner—Reinaldo P. Machado
Attorney, Agent, or Firm—Sinniger, Powers, Leavitt & Roedel

[57] ABSTRACT

A hunter's portable tree stand that has an elongated platform assembly whose rear end is secured against the trunk of a tree. A pair of support arm assemblies have their front ends pivotally secured the front end of the platform assembly. A V-shaped clamping yoke passes around the trunk of the tree and its opposite ends are detachably connected to the respective rear ends of the support arm assemblies. A pair of upright brace members that pivot at the top, which the bottom is adjustable and secured to the rear end of the platform assembly and their top ends connected to the rear end of the support arm assemblies. The support arm assemblies have a unique structure which allows for adjustment of the angle that the platform assembly makes with the trunk of a tree even when the hunter is standing thereon.

13 Claims, 1 Drawing Sheet

HUNTER'S PORTABLE TREE STAND

BACKGROUND OF THE INVENTION

The invention relates to a platform assembly and more specifically to one that is portable and has structure so it may be detachably secured to the trunk of a tree for supporting a hunter thereon.

It is often desirable for hunters to position themselves in an elevated position above the terrain upon which they are hunting. The hunter's view of the surrounding terrain is greatly increased and his field of aim is invariably increased, especially in a wooded area. Additionally, the hunter is far less likely to be seen by the hunted game if he is at a height elevated from the ground level.

There have been various types of hunter's stands heretofore designed and examples of these similar structures may be found in U.S. Pat. Nos.: 3,318,415; 3,392,802; 3,419,108 and 3,513,940. However, the tree stand of the instant invention includes structural and operational features which renders it a more stable support, more readily folded in a compact state, easier to erect and disassemble from an associated tree trunk, and also having means for adjusting the angle the platform assembly makes with the trunk of a tree even when the hunter is standing thereon.

It is an object of the invention to provide a novel hunter's portable tree stand that is lightweight and which can be folded into a compact state.

It is another object of the invention to provide a novel hunter's portable tree stand that has means for adjusting the angle the platform assembly makes with the trunk of a tree even when the hunter is standing thereon.

It is an additional object of the invention to provide a novel hunter's portable tree stand that is economical to manufacture and market.

SUMMARY OF THE INVENTION

Applicant's novel hunter's portable tree stand is formed from an elongated platform assembly formed of a frame whose interior is covered by an expanded metal panel. A pair of laterally spaced support arm assemblies have their front ends pivotally secured to the front end of the platform assembly. A V-shaped clamping yoke has its opposite ends detachably connected to the rear ends of the respective support arm assemblies. A pair of laterally spaced upright brace members have their top ends pivotally secured to the adjustment sleeve and the bottom of the upright bracer to the rear end of the platform assembly and their top ends are connected to the rear end of the support arm assemblies.

The support arm assemblies have an elongated adjustment sleeve that is internally threaded at both of its ends and they each receive an externally threaded rod or screw. By turning the adjustment sleeve in one direction support arm assemblies are lengthened and by turning the adjustment sleeve in the opposite direction the support arm assemblies are shortened. These changes allow for adjusting the angle that the platform assembly makes with the trunk of a tree even when the hunter is standing thereon.

A V-shaped brace is secured to the rear end of the platform assembly for stabilizing it against the curved surface of a tree trunk. An elongated safety belt has its opposite ends secured to laterally spaced points on the V-shaped clamping yoke and it grabs the tree trunk around its front to provide additional safety for the hunter.

DESCRIPTION OF THE PREFERRED EMBODIMENT

Figure 1:
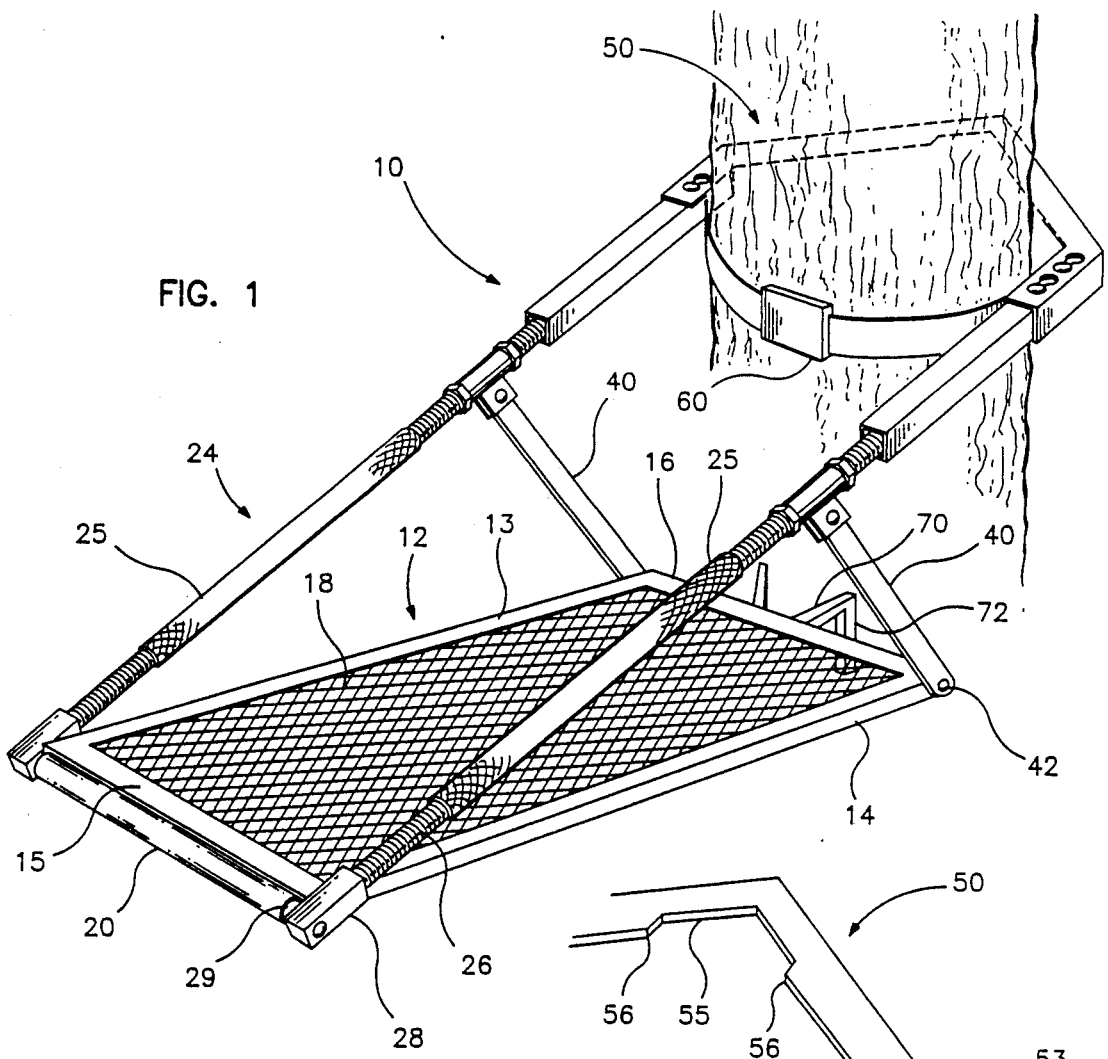
FIG. 1 is a side perspective view illustrating applicant's novel hunter's portable tree stand supported on the trunk of a tree.
Figure 2:
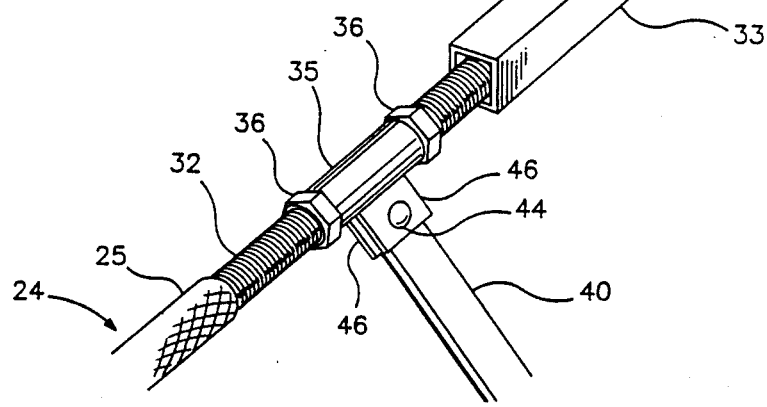
FIG. 2 is a partial side perspective view of the rear end of one of the support arm assemblies and it shows the manner in which it is secured to the V-shaped clamping yoke and one of the upright brace members.

Applicant's novel hunter's portable tree stand will now be described by referring to FIGS. 1-2 of the drawing. The tree stand is generally designated numeral 10.

Tree stand 10 has an elongated platform 12 formed from laterally spaced side members 13 and 14, front cross member 15 and rear cross member 16. An expanded metal panel 18 covers the interior of this framework. A sleeve 20 is secured to the front end of cross member 15.

A pair of laterally spaced support arms 24 have elongated adjustment sleeves 25 having a knurled outer surface. The adjustment sleeve 25 constitutes means for adjusting the angle of the platform 12 with respect to the tree trunk in this embodiment. Each adjustment sleeve 25 has a forward end and a rearward end, and is internally threaded at each end. Externally threaded forward rod 26 has a first end secured to square tubing member 28 that has a laterally extending pivot pin 29 extending from its forward end that is in turn received in one end of sleeve 20. A second end of the forward rod 26 is threadably engaged in the forward end of the adjustment sleeve 25. An externally threaded (rearward) rod 32 has a first end secured in square tubing member 33 and a second end which is threadably engaged in the rearward end of the adjustment sleeve 25. The angle the platform 12 makes with respect to the tree trunk may be adjusted by shortening or lengthening the support arms 24. To lengthen the support arms, thus pivoting the front end of the platform generally downwardly, the adjustment sleeves 25 are rotated about their longitudinal axes in a first direction such that portions of the second ends of the rods 26, 32 are forced out of the adjustment sleeves. To shorten the support arms 24, thus pivoting the front end of the platform generally upwardly, the adjustment sleeves 25 are rotated about their longitudinal axes in a second direction, opposite the first direction, such that portions of the second ends of the rods 26, 32 are drawn into the adjustment sleeves. Someone with ordinary skill in the art would readily appreciate that the screw threads in the forward end of the sleeve 25 and on the forward rod 26 are opposite those in the rearward end of sleeve 25 and on the rearward rod 32 (i.e., left handed threads versus right handed threads). This is necessary in order for the rods 26, 32, which are threadably engaged in opposite ends of the adjustment sleeve 25, to be simultaneously forced out of or drawn into the adjustment sleeve upon its rotation. It has been found that the adjustment sleeve may be easily rotated in either direction although the platform supports the weight of the hunter.

A tubular collar 35 telescopes over threaded rod 32. A pair of locking nuts 36 secure tubular collar in a predetermined position. Adjustable upright brace members 40 have their bottom ends secured to the rear end of platform 12. The top end of upright brace member 40 is connected to tubular collar 35 by a pivot pin 44 that passes through legs 46 extending outwardly from tubular collar 35. The position of the collar 5 may be adjusted by turning the locking nuts 36 in opposite directions on the rod 32.

V-shaped clamping yoke 50 has its opposite ends detachably secured to the respective square tubing members 33. This structure may have protruding members 52 that pass through slots 53 to make the clamping yoke easily removable so it may be passed around the trunk of the tree. Another form of structure would have aligned apertures in the ends of clamping yoke 50 and square tubing 33 through which a pin may be inserted to secure them together. A cutout portion is formed on the inner edge of V-shaped clamping yoke 50 to form a pair of teeth 56 that would bite into the trunk of the tree and make it more secure.

A safety belt 60 has its opposite ends secured to predetermine points on the V-shaped clamping yoke and safety belt 60 would pass around the front of the tree trunk to provide additional safety for the hunter standing thereon.

V-shaped brace 70 is secured to rear cross member 16 and it has a pair of downwardly extending legs 72 that aid to stabilize the rear of the platform assembly against the trunk of the tree.

What is claimed is:

1. A hunter's portable tree stand comprising:
   an elongated platform having a front end and a rear end;
   a pair of laterally spaced support arms each having a front end and a rear end;
   means pivotally securing the front ends of said support arms to the front end of the platform;
   a pair of laterally spaced upright brace members each having a top end and a bottom end, the bottom ends of said brace members being adjustable and connected to the rear end of the platform, the top ends of said brace members being connected to the rear ends of said support arms by a pivot pin; and
   a clamping yoke that passes around the trunk of a tree and it has opposite ends that are detachably connected to the respective rear ends of said support arms;
   said support arms each including means for selectively adjusting angle of the platform with respect to the trunk of the tree while said support arms continuously support the front end of the platform and the weight of a hunter thereon.

2. A hunter's portable tree stand as recited in claim 1 further comprising an elongated safety belt having opposite ends that are secured to laterally spaced points on said clamping yoke.

3. A hunter's portable tree stand as recited in claim 1 wherein the platform is formed of a frame having a pair of laterally spaced elongated side members, a front cross member and a rear cross member, an expanded metal panel covers the interior of said frame.

4. A hunter's portable tree stand as recited in claim 1 wherein said clamping yoke has a V-shaped configuration.

5. A hunter's portable tree stand as recited in claim 1 further comprising a V-shaped brace secured to the rear end of the platform for stabilizing it against the curved surface of a tree trunk.

6. A hunter's portable tree stand as recited in claim 1 wherein said means for adjusting the angle of the platform is adapted to lengthen said support arm upon rotation in a first direction thereby pivoting the front end of the platform generally downwardly, and to shorten the length of said support arm upon rotation in a second direction thereby pivoting the front end of the platform generally upwardly.

7. A hunter's portable tree stand as recited in claim 6 wherein each said support arm comprises a forward externally threaded rod, and a rearward externally threaded rod, and wherein said support arm adjusting means comprises an internally threaded adjustment sleeve having forward and rearward ends, the forward rod having a first end pivotally attached to the front end of the platform and a second end threadably engaged in said forward end of the sleeve, the rearward rod having a first end connected to the clamping yoke and a second end threadably engaged in the rearward end of the sleeve, the sleeve being adapted upon rotation about its axis in a first direction to let out portions of the forward and rearward rods from the sleeve thereby to lengthen said support arm and upon rotation about its axis in a second direction opposite said first direction to draw portions of the second ends of the forward rod and the rearward rod into the sleeve thereby shortening the length of said support arm.

8. A hunter's portable tree stand as recited in claim 7 wherein said brace members each comprise a tubular collar at its top end receiving a portion of the rearward rod of said support arm therethrough, and a pair of locking nuts threadably engaging the rearward rod and disposed on opposite ends of the tubular collar for fixing the longitudinal position of the tubular collar on the rearward rod, the tubular collar being adjustable longitudinally of the rearward rod by turning the locking nuts.

9. A hunter's portable tree stand comprising:
   a platform having a front end and a rear end;
   a yoke passing around the trunk of a tree; and
   support arm secured at one end to the platform generally at its front end and at another end to the yoke, said support arm means including means for selectively adjusting angle of the platform with respect to the trunk of the tree while said support arm means continuously supports the front end of the platform and the weight of a hunter thereon.

10. A hunter's portable tree stand as recited in claim 9 wherein said means for adjusting the angle of the platform is adapted to lengthen said support arm means upon rotation in a first direction thereby pivoting the front end of the platform generally downwardly, and to shorten the length of said support arm means upon rotation in a second direction thereby pivoting the front end of the platform generally upwardly.

11. A hunter's portable tree stand as recited in claim 10 wherein said support arm means comprises at least two laterally spaced support arms.

12. A hunter's portable tree stand as recited in claim 11 wherein each support arm comprises a forward externally threaded rod, and a rearward externally threaded rod, and wherein said means for adjusting the angle of the platform comprises an internally threaded adjustment sleeve having forward and rearward ends, the forward rod having a first end pivotally attached to the front end of the platform and a second end threadably engaged in said forward end of the sleeve, the rearward rod having a first end connected to the clamping yoke and a second end threadably engaged in the rearward end of the sleeve, the sleeve being adapted upon rotation about its axis in a first direction to let out portions of the forward and rearward rods from the sleeve thereby to lengthen said support arm and upon rotation about its axis in a second direction opposite said first direction to draw portions of the second ends of the forward rod and the rearward rod into the sleeve thereby shortening the length of said support arm.

13. A hunter's portable tree stand as recited in claim 12 further comprising brace members each including a bar pivotally mounted at its bottom end on the platform generally at the rear end thereof, a tubular collar pivotally attached to the top end of the bar and receiving a portion of the rearward rod of the support arm therein, and a pair of locking nuts threadably engaging the rearward rod and disposed on opposite ends of the tubular collar for fixing the longitudinal position of the tubular collar on the rearward rod, the tubular collar being adjustable longitudinally of the rearward rod by turning the locking nuts.

* * * * *